United States Patent

[11] 3,542,398

[72] Inventor Irving L. Melroe
 Lisbon, North Dakaota 58054
[21] Appl. No. 755,331
[22] Filed Aug. 26, 1968
[45] Patented Nov. 24, 1970

[54] HITCH WITH CABLE AND WINCH
 5 Claims, 3 Drawing Figs.
[52] U.S. Cl. .................................................. 280/477,
 280/480
[51] Int. Cl. ..................................................... B60d 1/18,
 B62d 53/00
[50] Field of Search .................................... 280/477,
 478, 479, 480, 491(.8)

[56] References Cited
 UNITED STATES PATENTS
 1,692,071 11/1928 Austin et al. ............... 280/515
 1,730,077 10/1929 Isachsen .................... 280/421
 2,150,010 3/1939 Solomon .................... 280/477
 2,459,731 1/1949 Wymore ..................... 280/479
 2,687,900 8/1954 Thomas ...................... 280/515
 2,753,192 7/1956 Davis ......................... 280/477
 3,345,082 10/1967 Atkins ........................ 280/477

*Primary Examiner*—Leo Friaglia
*Attorney*—Frederick E. Lange, John J. Held, Jr., and Eugene L. Johnson ABSTRACT: Apparatus for hitching an implement to a prime mover. A cable, wound around a winch, passes through a hitch seat and is attached to a removable hitch bar. The hitch bar may be removed from the hitch seat as the cable unwinds, attached to the implement, and then drawn into seated position by reeling-in the cable to thereby pull the implement to the prime mover. Releaseable means is provided for locking the hitch bar in its seated position. Removable stop means is provided for preventing the hitch from being drawn completely through the hitch seat as the cable is reeled-in.

Patented Nov. 24, 1970

3,542,398

INVENTOR.
IRVING L. MELROE
BY
ATTORNEY

HITCH WITH CABLE AND WINCH

BACKGROUND OF THE INVENTION

The invention pertains to the field of attaching towed implements to a prime mover. More particularly, it relates to means for facilitating the attachment of a towed implement to a prime mover to enable one operator to accomplish the task. It also relates to the field of self-rescue of a prime mover from a bogged-down position.

While various means have been discussed in the prior art for attaching a towed implement to a prime mover and for self-rescue from a bogged-down or stuck position, the prior art fails to discuss the specific advantages of the present invention. The prior art patents of Wylie (U.S. Pat. No. 1,537,213) and Forrest (U.S. Pat. No. 1,566,740) discuss means for rescuing a prime mover and its towed implement out of a bogged-down position, but the locking features of the present invention are not discussed. The Smith patent (U.S. Pat. No. 2,306,231 similarly fails to discuss the locking and seating features of the present invention.

In attaching a towed implement to a prime mover, it has always been a problem to achieve a registration between the implement drawbar and the tractor drawbar. The problem is derived from the fact that both the implement and prime mover have considerable mass or weight which cannot be easily and precisely moved in the small increments necessary to obtain precise registration of the implement drawbar with the tractor drawbar. The present invention solves this problem to the extent that the hitching operation may be accomplished by one man only. Thus, with the present invention, it is not necessary to have one man standing at the implement drawbar ready to insert the pin, while another man operates the prime mover.

The present invention also provides significant advantages in the field of self-rescue.

SUMMARY

The present invention consists of an apparatus for attaching a towed implement to a prime mover. It includes a hitch bar and a hitch seat mounted to the prime mover and adapted to accept the hitch bar in seated engagement therewith. A winch is mounted to the prime mover and driven by actuating means mounted thereto. A cable extends from the winch through the hitch seat and to the hitch bar. Means is provided for releaseably locking the hitch bar to the hitch seat when seated therein. Means is also provided for self-alignment of the hitching mechanism during the hitching operation.

The primary object of the present invention is to provide means for attaching a towed implement to a prime mover which allows the attachment to be accomplished by one operator only.

It is also an object to provide hitching means which is self-aligning during hitching operation, and which is characterized by a flared hitch seat which further facilitates seating of the hitch bar.

It is also an object to provide a hitching mechanism with removable means for defining the seated position of the hitch bar which, when removed, allows the hitch bar to be passed through the hitch seat for use in front of the prime mover. It is also an object to provide means for unlocking the hitch bar from the hitch seat which means may be operated by the operator seated on the prime mover.

DESCRIPTION OF PREFERRED EMBODIMENT

Figure 1:
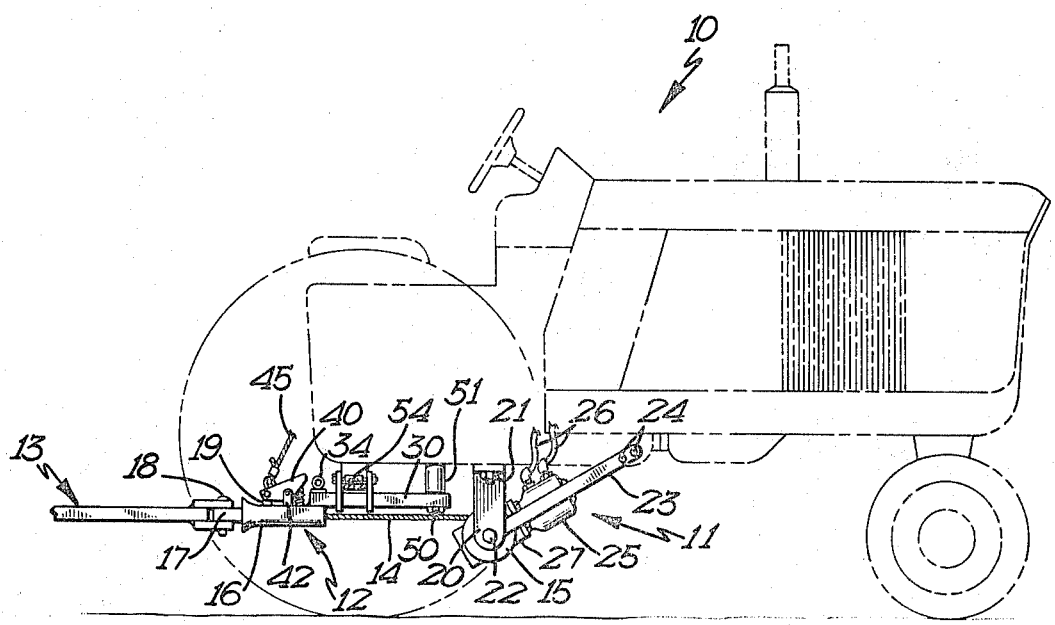
FIG. 1 is a side view which shows a prime mover (in this case a farm tractor) with the present invention mounted thereto.

The general nature of the preferred embodiment may be best understood with reference to FIG. 1. The invention is shown in association with a prime mover represented by tractor 10. The apparatus includes a winch assembly 11 and a hitch mechanism 12. An implement drawbar 13 connects with hitch mechanism 12. Cable 14 is wound around winch 15 and extends rearwardly through flared hitch seat 16 to connect with hitch bar 17. Hitch bar 17 may be removed from seated engagement with hitch seat 16, as cable 14 unwinds from winch 15, and attached by means of pin 18 to implement drawbar 13. Winch 15 is then actuated to reel-in cable 14, thereby drawing hitch bar 17 and the implement (not shown attached thereto into hitched relationship with prime mover 10. When seated, hitch bar 17 is pinned to hitch seat 16 as shown at pin 19.

Figure 2:
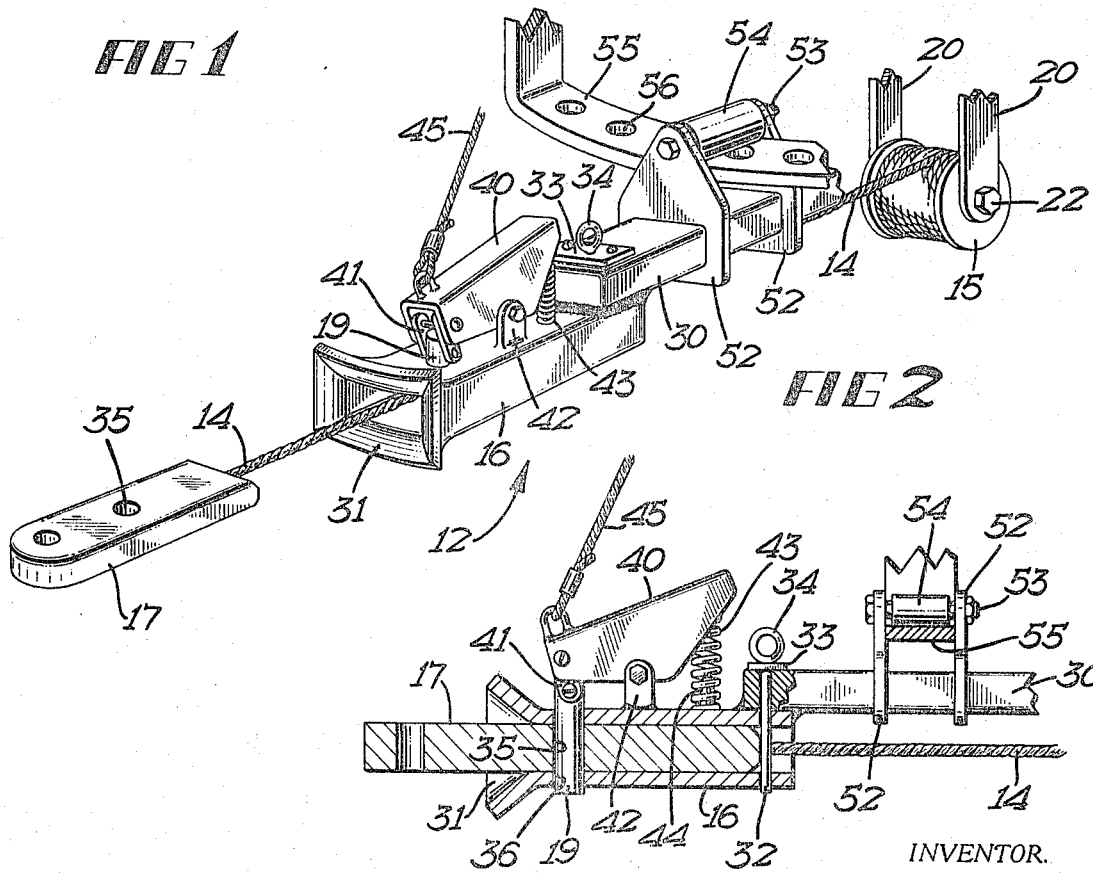
FIG. 2 is a perspective view of the present invention and shows the novel hitch mechanism. A portion of the tractor drawbar assembly has been removed and the means for actuating the winch has also been removed.
Figure 3:
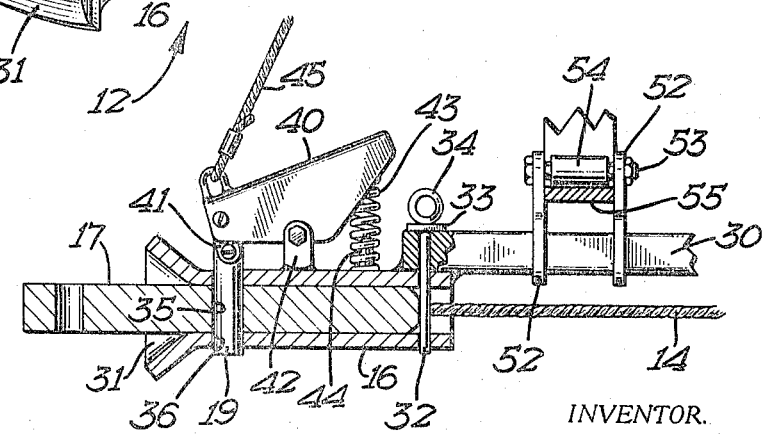
FIG. 3 is a vertical longitudinal view of the present invention and shows the hitch bar in its seated position, the releaseable means for locking the hitch bar in its seated position, and the removable means for preventing the hitch bar from being drawn completely through the hitch seat.

The detailed nature of the present invention may be understood with reference to FIGS. 1, 2 and 3. With reference first to FIG. 1, the winch assembly 11, includes a pair of vertical mounting brackets 20 which are mounted to the bottom of the tractor frame by means of fasteners 21. Winch 15 is rotatable on shaft 22 which extends through both of the mounting brackets 20. A pair of braces 23 extend from shaft 22 forwardly and upwardly and attach securely to the tractor frame by means of fasteners 24. Winch 15 therefore securely mounted for rotation about the axis of shaft 22.

Hydraulic motor 25 which includes hydraulic fluid lines 26 is mounted to motor bracket 27, which in turn, is mounted to vertical bracket 20 in a conventional driving connection (not shown), provided from hydraulic motor 25 to winch 15.

While those skilled in the art may prefer other ways and types of winch accentuating means, and while other ways and types may be desirable for other applications of the principles of the present invention, one suitable winch and hydraulic motor is available from the Tulsa Winch Division of Vickers Mobile Hydraulics Division of Sperry Rand Corporation. More particularly, one suitable winch and motor unit available from Sperry Rand Corporation (Tulsa Winch Division) is Model Number H5D2, 4,000 pounds line pull, 27 FPM line speed, and 16 GPM at 1800 r.p.m.

The detailed nature of hitch mechanism 12 may be best understood with reference to FIGS. 2 and 3. Hitch seat 16 is welded to tractor drawbar 30 and is provided with a flared receiving end 31. The flared portion 31 of hitch seat 16 serves to channel hitch bar 17 into its seated position as cable 14 is reeled-in. The seated position of hitch bar 17 is defined by a pair of pins 32 which extend through tractor drawbar 30 and hitch seat 16, as best seen in FIG. 3. Seating pins 32 are attached to a common plate 33 which is provided with a ring 34 to facilitate insertion and removal of the two pins simultaneously. Pins 32 straddle cable 14 and provide a surface against which hitch bar 17 bottoms, to thereby define the seated position, as will be more fully explained below. When it is desired to pull hitch bar 17 completely through hitch seat 16, pins 32 may be removed.

When in the seated position, opening 35 of hitch bar 17 is in registration with upper and lower openings 36 of hitch seat 16, best seen in FIG. 3. Consequently, pin 19 may be inserted through the registered openings 35 and 36 to thereby lock hitch bar 17 in seated relationship with hitch seat 16.

Locking pin 19 is mounted on rocker 40 by means of link 41. Link 41 provides a pivotally and arcuately movable joint between pin 19 and rocker 40 to thereby allow pin 19 to move longitudinally and angularly with respect to rocker 40 during insertion and removal. Rocker 40 is mounted for pivotal movement on rocker brackets 42, best seen in FIGS. 2 and 3. Spring 43 extends from a stud (not shown) mounted to rocker 40, to stud 44 mounted to hitch seat 16. Thus rocker 40 is urged in a counterclockwise direction about its pivotal connection to brackets 42, as viewed in FIG. 3, to thereby hold pin 19 in the inserted position shown in FIG. 3. When it is desired to remove pin 19 and thereby unlock hitch bar 17 from its seating relationship with hitch seat 16, rocker 40 may be pivoted in a clockwise direction as viewed in FIG. 3 by pulling on rope 45. Thus, an operator seated on tractor 10 may unlock hitch bar 17 by pulling on rope 45 to thereby withdraw pin 19 and release the implement from hitched relationship with the tractor, without leaving the tractor seat.

The mounting of the hitch mechanism 12 to the tractor 10 may be best seen in FIGS. 1 and 2. Tractor drawbar 30 is pivotally mounted to the lower frame of tractor 10 by means of pin 50 and bushing 51. A pair of drawbar brackets 52 are mounted to pin 53 which also serves as a means for mounting roller 54. Tractor drawbar 30 is suspended on brackets 52. Roller 54 rides on arcuate track 55 which is suspended from the frame of tractor 10. A series of openings 56 is provided in arcuate track 55 to serve as a means for fixing the position of roller 54 when pins (not shown) are inserted therein. With the mounting described above, the tractor drawbar 30 may be pivotally moved about pin 50 to thereby allow hitch mechanism 12 to assume a position in alignment with cable 14 under tension. The importance of this feature will be more particularly described below.

In operation, when it is desired to attach an implement to hitch mechanism 12, pin 19 is removed by pulling upwardly on rope 45. Hitch bar 17 may then be withdrawn from hitch seat 16 and, as cable 14 unwinds, may be attached to implement drawbar 13 by pin 18. The operator then starts hydraulic motor 25 which actuates winch 15 to thereby reel-in cable 14 and draw hitch bar 17 into seated engagement with hitch seat 16. Seating pins 32 stop hitch bar 17 when opening 35 becomes registered with openings 36. Pin 19 is then inserted under the force of spring 43 and hitch bar 17 is locked to hitch seat 16. During the process of inserting pin 19 into the registered openings 35 and 36, link 41 allows pin 19 to both pivot and be displaced to thereby insure a good alignment with the openings 35 and 36.

As cable 14 is reeled-in on winch 15 to thereby pull implement drawbar 13 into hitched relationship with prime mover 10 as described above, tractor drawbar 30 is free to pivot about pin 50 as roller 54 tracks on arcuate track 55. Thus, if there is any misalignment between the initial position of hitch mechanism 12 and implement drawbar 13, tractor drawbar 30 of hitch mechanism 12 is free is pivot about pin 51 to thereby align itself with cable 14 under tension. Flared portion 31 of hitch seat 16 serves to further guide hitch bar 17 into its proper seated position in hitch seat 16 during the foregoing operation.

In the event that tractor 10 becomes bogged-down and is unable to move forward with an implement attached, the operator seated on tractor 10 may pull on rope 45 thereby unlocking hitch bar 17 from hitch seat 16. With hydraulic motor 25 disconnected, tractor 10 may be driven forwardly out of its bogged-down position as cable 14 unwinds from winch 15. When tractor 10 reached stable ground, hydraulic motor 25 may be actuated to reel-in cable 14 on winch 15 and pull the implement to the tractor for attachment once again in the manner described above.

The present invention may also be used as an aid in moving tractor 10 out of an extreme bogged-down position, that is, one in which the tractor cannot be driven out even after disconnecting the implement. For that purpose, seating pins 32 may be removed along with locking pin 19 and hitch bar 17 may be pulled completely through hitch seat 16. Hitch bar 17 may then be positioned forwardly of the tractor and fixed at that point. More particularly, hitch bar 17 may be attached to a "dead man," tree or some other fixed object in front of the tractor. Hydraulic motor 25 may then be actuated to reel-in cable 14 on winch 15 thereby providing an additional motivating force to move tractor 10 from the extreme bogged-down position. The present invention may then serve to allow tractor 10 to pull itself out of the stuck position.

Variations may be made in the design of the preferred embodiment without departing from the spirit and scope of the invention and the scope of the attached claims.

Having thus described the invention, the following is claimed:

I claim:

1. Apparatus for attaching an implement to a prime mover comprising:
   a hitch bar having an opening therein;
   a hitch seat adapted for mounting to said prime mover and adapted to accept said hitch bar in seated engagement therewith, said hitch seat having an opening disposed to register with said opening in said hitch bar when said hitch bar is seated therein;
   removable means for stopping said hitch bar in seated engagement in said hitch seat with said opening in said hitch bar in registration with said opening in said hitch seat, said hitch bar being slidable completely through said hitch seat when said removable means is removed;
   a winch adapted for mounting to said prime mover;
   means for driving said winch;
   flexible means attached to said hitch bar and extending to said winch; and
   a pin for releasably locking said hitch bar in seated engagement with said hitch seat including means for inserting and removing said pin from said openings.

2. A prime mover having apparatus for attaching an implement thereto and for pulling said prime mover from a stuck position comprising:
   a hitch bar;
   a flared hitch seat mounted to said prime mover and adapted to accept said hitch bar in seated engagement therewith;
   a winch mounted to said prime mover;
   a hydraulic motor drivingly connected to said winch;
   a cable attached to said hitch bar and wound on said winch;
   means for releasably locking said hitch bar in seated engagement with said hitch seat comprising:
      a hitch pin,
      an opening in said hitch seat,
      an opening said hitch bar disposed to register with said opening in said hitch seat when said hitch bar is seated therein, and
      means for inserting and removing said pin from said openings; and
   removable means for stopping said hitch bar in seated engagement in said hitch seat with said opening in said hitch bar in registration with said opening in said hitch seat, said hitch bar being slidable completely through said hitch seat when said removable means are removed from said hitch seat.

3. The prime mover of claim 2 wherein said removable means for stopping said hitch bar in seated engagement in said hitch seat with said openings in registration comprises a pair of removable pins extending transversely through said hitch seat on opposite sides of said cable.

4. The prime mover of claim 2 wherein said means for inserting and removing said pin from said openings comprises:
   a rocker pivotally mounted to said hitch seat;
   means pivotally mounting said hitch pin to said rocker for movement into and out of said openings when in registration; and
   means for rocking said rocker to thereby insert and remove said hitch pin from said openings.

5. The prime mover of claim 4 and resilient means for urging said hitch pin into said openings.